Patented Feb. 9, 1943

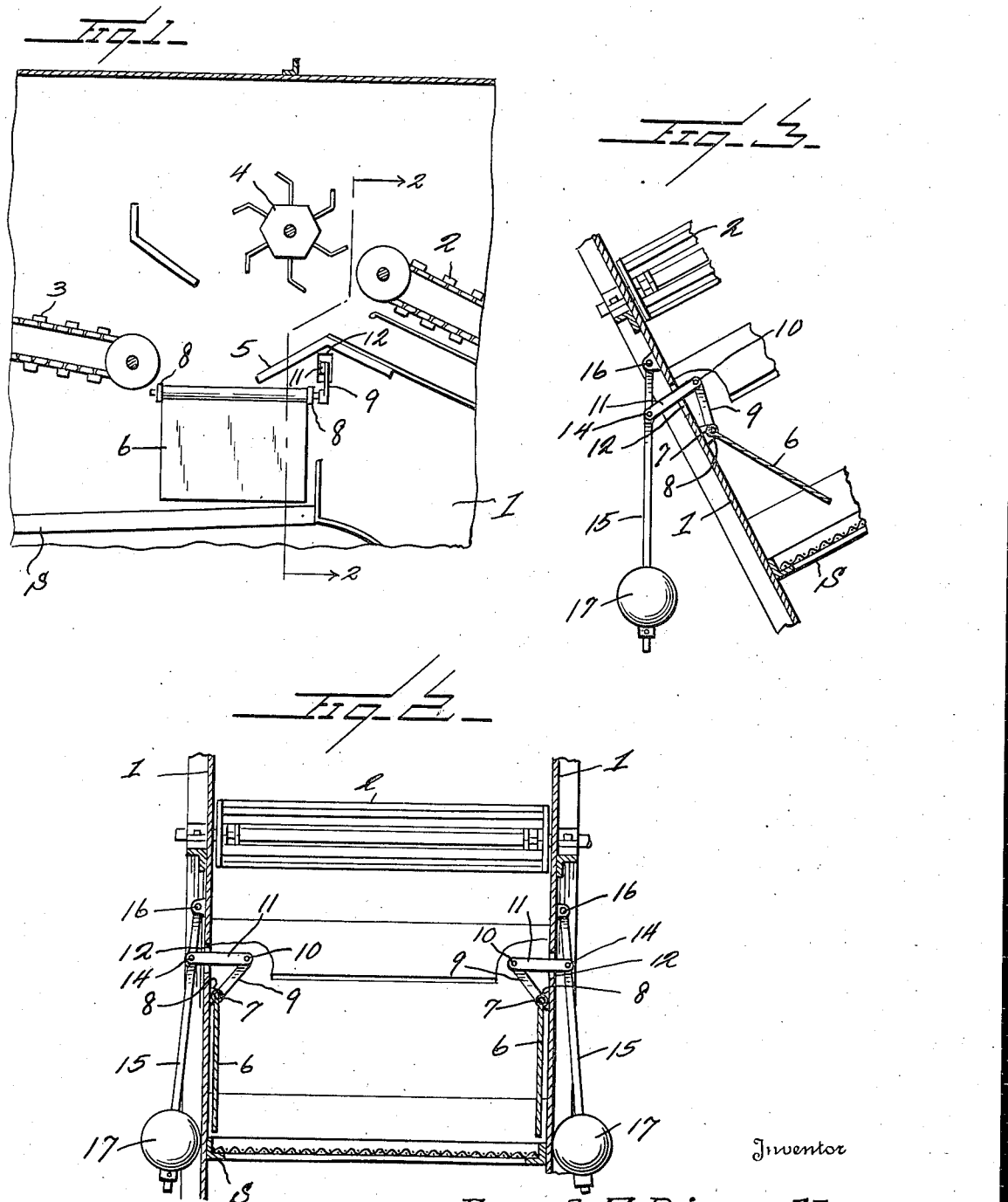

2,310,610

UNITED STATES PATENT OFFICE 2,310,610

DEFLECTOR FOR GRAIN

Ernest F. Bissell, Hayden, Colo.

Application August 16, 1941, Serial No. 407,204

4 Claims. (Cl. 209—254)

This invention relates to a deflector, and has relation more particularly to a deflector for use in connection with a combine harvester, and it is an object of the invention to provide a deflector which operates automatically to assure an effective distribution of the grain over the cleaning sieves or screens when the combine is subjected to extreme pitches from side to side, as when the combine is being operated on hillsides.

It is another object of the invention to provide a deflector of this kind which operates to assure equal distribution of threshed grain over the cleaning sieves or screens in a manner to materially increase the efficiency of the combine, both as to volume of output and the effectiveness of the cleaning.

It is also an object of the invention to provide a deflector so constructed and mounted to assure even distribution of the threshed grain over the cleaning sieves or screens in a manner to cause such covering of the sieves or screens to eliminate escape of wind through uncovered portions of the screens or sieves.

The invention consists in the details of construction and in the combination and arrangement of the several parts of my improved deflector for grain whereby certain important advantages are attained, as will be hereinafter more fully set forth.

In order that my invention may be the better understood, I will now proceed to describe the same with reference to the accompanying drawing, wherein:

Figure 1 is a fragmentary view, partly in section and partly in elevation, illustrating a deflector constructed in accordance with an embodiment of my invention in applied position;

Figure 2 is a sectional view taken substantially on the line 2—2 of Figure 1; and Figure 3 is a fragmentary vertical sectional view illustrating the combine in a tilted or pitched position with the deflector in its spreading position.

As disclosed in the accompanying drawing, I denotes the side walls of a conventional combine and between which are mounted and arranged in the usual manner the raddles 2 and 3 with the beater 4 positioned, as usual, in advance of the discharge end of the delivery raddle 2. The raddle 3 for carrying off the straw is placed the usual distance from and below the delivery raddle 2.

The threshed grain is directed by the apron 5 upon the top separating screen or sieve S. The required air or wind blasts are delivered in the usual manner. It is to be stated that the foregoing parts in themselves form no part of the present invention, as such structure is an assembly already known and in common use.

When a combine is working along hillsides, or the combine is caused to pitch from side to side for any reason, the threshed grain is not received upon the sieves or screens S in a manner to properly cover the screens or sieves to assure maximum efficiency of the wind in cleaning the grain. To avoid this disadvantage, and thereby assure a maximum of efficiency, each of the side walls I immediately below the apron 5 is provided with a deflector plate 6. This plate is imperforate and is of required dimensions so that the plate 6 will extend from a point rearwardly of the apron 5 to a point closely adjacent to the raddle 3, and will also extend downwardly from the delivery end of the apron 5 to a point closely adjacent the top sieve or screen S.

The upper portion of each of the plates 6 is fixed to a shaft 7 which has its extremities rotatably engaged with the supporting bearings 8 extending inwardly from the adjacent side wall I so that the plate 6 is free to swing.

One end portion of the shaft 7 has fixed thereto a rock arm 9 which extends upwardly and is operatively connected, as at 10, to a rigid link 11. This link 11 extends outwardly through the adjacent side wall I through a suitably positioned opening 12 and is pivotally connected, as at 14, to an elongated and vertically directed arm 15. This arm 15 is at the exterior side of the wall I, and has its upper end portion pivotally connected, as at 16, to the side wall I at a desired point above the opening 12. This arm 15 is of desired length and mounted upon the lower portion thereof is a weighted member 17.

The weighted member 17 operates by gravity to normally swing to its innermost position with respect to the adjacent side wall I and thereby, through the medium of the associated link 11 and rock arm 9, maintains the adjacent deflector plate 6 at the limit of its movement toward the side wall I. As is clearly illustrated in Figure 2, there is a deflector plate 6 and its associated mechanism at opposite sides of the combine so that upon tilting or pitching of the combine in either direction, the deflector plate 6 will be swung inwardly a distance determined by the extent of tilting or pitching, as is illustrated in Figure 3. As either of these plates 6 is moved inwardly it serves to deflect the threshed grain upon the sieves or screens S in a manner to assure equal distribution of such grain over the screens or sieves S, and thus maintain the maximum efficiency of the combine, and particularly as pertains to the cleaning of the grain.

In view of the foregoing, it is believed to be apparent that the use and operation of the invention as herein comprised, results not only in cleaning the grain, but also saving the grain and preventing waste and loss thereof which would occur should the grain be permitted to accumulate and pile up. If the grain is not evenly distributed, the screens or sieves S will be overtaxed and, therefore, not allow free passage of the grain therethrough to the pan or elevator beneath, and a portion of the accumulated grain, as a result of the congestion, will be delivered and wasted to the rear of the screen and on the ground with the chaff.

It is also to be pointed out that by use of the deflector as herein set forth, a continuous uniform operation of the harvester is permitted without stopping or slacking for cleaning or manual distribution of the grain. The use of the deflector results in the machine being as efficient on slopes and hillsides as on level ground and, in fact, increases the efficiency of the harvester for the reason that the grain is shaken and distributed diagonally from corner to corner across the screen or sieve S, as a result of which the perforations and roughened surfaces of the sieve or screen come in contact with and operate upon the grain to a greater extent and more vigorously than when the grain moves horizontally and parallel to the sides of the seive or screen from the front to the rear.

From the foregoing description it is thought to be obvious that a deflector for grain constructed in accordance with my invention is particularly well adapted for use by reason of the convenience and facility with which it may be assembled and operated.

I claim:

1. A grain deflector for a cleaning screen of a combine comprising a vertically arranged plate for position above a cleaning screen and at the side thereof at the receiving end portion of the screen, means for pivotally mounting the upper extremity of the plate in a position to swing over the screen in a direction transversely of the screen, and freely pendulating means operatively engaged with the plate to rock the plate inwardly over the screen as the combine tilts.

2. In a combine having a cleaning screen, means for delivering threshed grain upon the screen and a side wall adjacent to the screen, a vertically arranged deflector plate positioned to one side of the screen at the portion thereof upon which the threshed grain is delivered, said plate being closely adjacent to the inner face of the side wall, means for pivotally mounting the upper portion of said plate to the side wall, a rock arm operatively connected to the plate, a freely pendulating lever at the exterior side of the wall, and a connection between the pendulating lever and the rock arm for swinging the plate inwardly and transversely over the screen when said wall is titlted or pitched.

3. In a combine having a cleaning screen, means for delivering threshed grain upon the screen and a side wall adjacent to the screen, a vertically arranged deflector plate positioned to one side of the screen at the portion thereof upon which the threshed grain is delivered, said plate being closely adjacent to the inner face of the side wall, means for pivotally mounting the upper portion of said plate to the side wall, a rock arm operatively connected to the plate, a freely pendulating lever at the exterior side of the wall, and a connection between the pendulating lever and the rock arm for swinging the plate inwardly and transversely over the screen when said wall is tilted or pitched, said connection between the rock arm and the pendulating lever comprising a rigid link pivotally connected to the rock arm and to the lever, the wall having an opening through which said link is directed.

4. In a combine having a cleaning screen, means for delivering threshed grain upon the screen and a side wall adjacent to the screen, a vertically arranged deflector plate positioned to one side of the screen at the portion thereof upon which the threshed grain is delivered, said plate being closely adjacent to the inner face of the side wall, means for pivotally mounting the upper portion of said plate to the side wall, a rock arm operatively connected to the plate, a lever at the exterior side of the wall and disposed in a vertical direction, means for pivotally connecting the upper end portion of said lever to the wall at a point above the pivotal mounting for the upper portion of the plate, a weighted member carried by the lower portion of the lever, an upstanding rock arm operatively connected to the upper pivoted end portion of the plate, and a connection between the lever and the rock arm for swinging the plate inwardly and transversely over the screen when said wall is tilted or pitched.

ERNEST F. BISSELL.